United States Patent
Asano (10) Patent No.: US 8,809,757 B2
(45) Date of Patent: Aug. 19, 2014

(54) OPTICAL APPARATUS HAVING IMAGE SHAKE CORRECTING FUNCTION INCLUDING ANGULAR VELOCITY SENSORS

(75) Inventor: Takurou Asano, Kawachi-gun (JP)

(73) Assignee: Canon Kabushiki Kaisha (JP)

( * ) Notice: Subject to any disclaimer, the term of this patent is extended or adjusted under 35 U.S.C. 154(b) by 486 days.

(21) Appl. No.: 13/117,735

(22) Filed: May 27, 2011

(65) Prior Publication Data

US 2011/0292510 A1 Dec. 1, 2011

(30) Foreign Application Priority Data

Jun. 1, 2010 (JP) ................................. 2010-125856

(51) Int. Cl.
*H01L 27/00* (2006.01)

(52) U.S. Cl.
USPC ......... 250/208.1; 250/214.1; 396/52; 396/53; 348/208.2

(58) Field of Classification Search
USPC ...... 250/208.1, 208.2, 214 R, 214.1, 214 DC; 396/50, 52–55; 348/208.99, 208.1, 348/208.2, 208.4, 208.5, 208.7, 208.11
See application file for complete search history.

(56) References Cited

U.S. PATENT DOCUMENTS

| 5,790,490 A * | 8/1998 | Satoh et al. ..................... 396/52 |
| 7,564,482 B2 * | 7/2009 | Clarke et al. ............... 348/208.1 |
| 2010/0215353 A1 * | 8/2010 | Hashi et al. ..................... 396/55 |

FOREIGN PATENT DOCUMENTS

| CN | 1732406 A | 2/2006 |
| EP | 1022543 A | 7/2000 |
| JP | 2004-301512 A | 10/2004 |
| JP | 2005321726 A | 11/2005 |
| JP | 2006292845 A | 10/2006 |
| JP | 2007-164040 A | 6/2007 |
| JP | 2009-008936 A | 1/2009 |
| JP | 2009-270921 A | 11/2009 |
| WO | WO 2009/060626 A1 * | 5/2009 ............. H04N 5/232 |

OTHER PUBLICATIONS

Notification of the First Office Action for corresponding CN 201110139330.5, dated Jun. 20, 2013. English translation provided.
European Search Report issued Sep. 16, 2011 in corresponding European Application No. 11167395.0.

* cited by examiner

*Primary Examiner* — Francis M Legasse, Jr.
(74) *Attorney, Agent, or Firm* — Rossi, Kimms & McDowell, LLP (57) ABSTRACT

Provided is an optical apparatus including: an image shake correcting unit for canceling an image shake generated due to a vibration; at least two angular velocity sensors having axes for detecting an angular velocity, the axes being parallel to each other; a vibration angle computing unit for calculating a vibration angle output based on output of the at least two angular velocity sensors; and a driving unit for driving the image shake correcting unit according to the vibration angle calculated by the angle computing unit.

3 Claims, 14 Drawing Sheets

OPTICAL APPARATUS HAVING IMAGE SHAKE CORRECTING FUNCTION INCLUDING ANGULAR VELOCITY SENSORS

BACKGROUND OF THE INVENTION

1. Field of the Invention

The present invention relates to an optical apparatus having an image shake correcting function.

2. Description of the Related Art

In recent years, an image shake correcting function for correcting image shakes in a still image and a moving image has been required for an image pickup system using a lens. In order to realize the image shake correcting function, it is necessary to detect a vibration. For detecting the vibration, a method using an angular velocity sensor such as a gyrosensor is mainly employed. In general, the gyrosensor has structure which is likely to generate low-frequency noise. Even when no vibration is applied, an output of the gyrosensor disadvantageously fluctuates. Therefore, there arises a problem in that an image being picked up moves slowly because the image shake correction is performed even though no vibration is applied.

In order to solve the problem described above, a method of combining outputs of multiple angular velocity sensors having different characteristics to obtain an angular velocity, and a method of performing switching between multiple angular velocity sensors having different characteristics according to photographing modes for use have been proposed (Japanese Patent Application Laid-Open No. 2005-321726 and Japanese Patent Application Laid-Open No. 2006-292845).

According to the methods described in Japanese Patent Application Laid-Open No. 2005-321726 and No. 2006-292845, however, an image swinging amount generated when no vibration is applied (hereinafter, referred to simply as "image swinging amount") is determined by an angular velocity sensor having the best noise characteristic among the multiple angular velocity sensors. Specifically, the image swinging amount cannot be further reduced by the above-mentioned methods in comparison with that in the case where a single angular velocity sensor having the best noise characteristic is used.

SUMMARY OF THE INVENTION

In view of the problem described above, an exemplary object of the present invention is to provide an optical apparatus having an image shake correcting function, with a reduced image swinging amount generated due to noise of angular velocity sensors.

In order to achieve the above-mentioned object, an optical apparatus according to the present invention includes: a unit for displacing an imaging position in a direction perpendicular to an optical axis; at least two angular velocity sensors having axes for detecting an angular velocity, the axes being parallel to each other; an angle computing unit for calculating an angle based on output of the at least two angular velocity sensors; and a driving unit for driving the unit for displacing the imaging position in the direction perpendicular to the optical axis according to the angle calculated by the angle computing unit.

According to the present invention, the image swinging amount generated due to the noise of the angular velocity sensors can be reduced at the time when the image shake correcting function is in operation.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
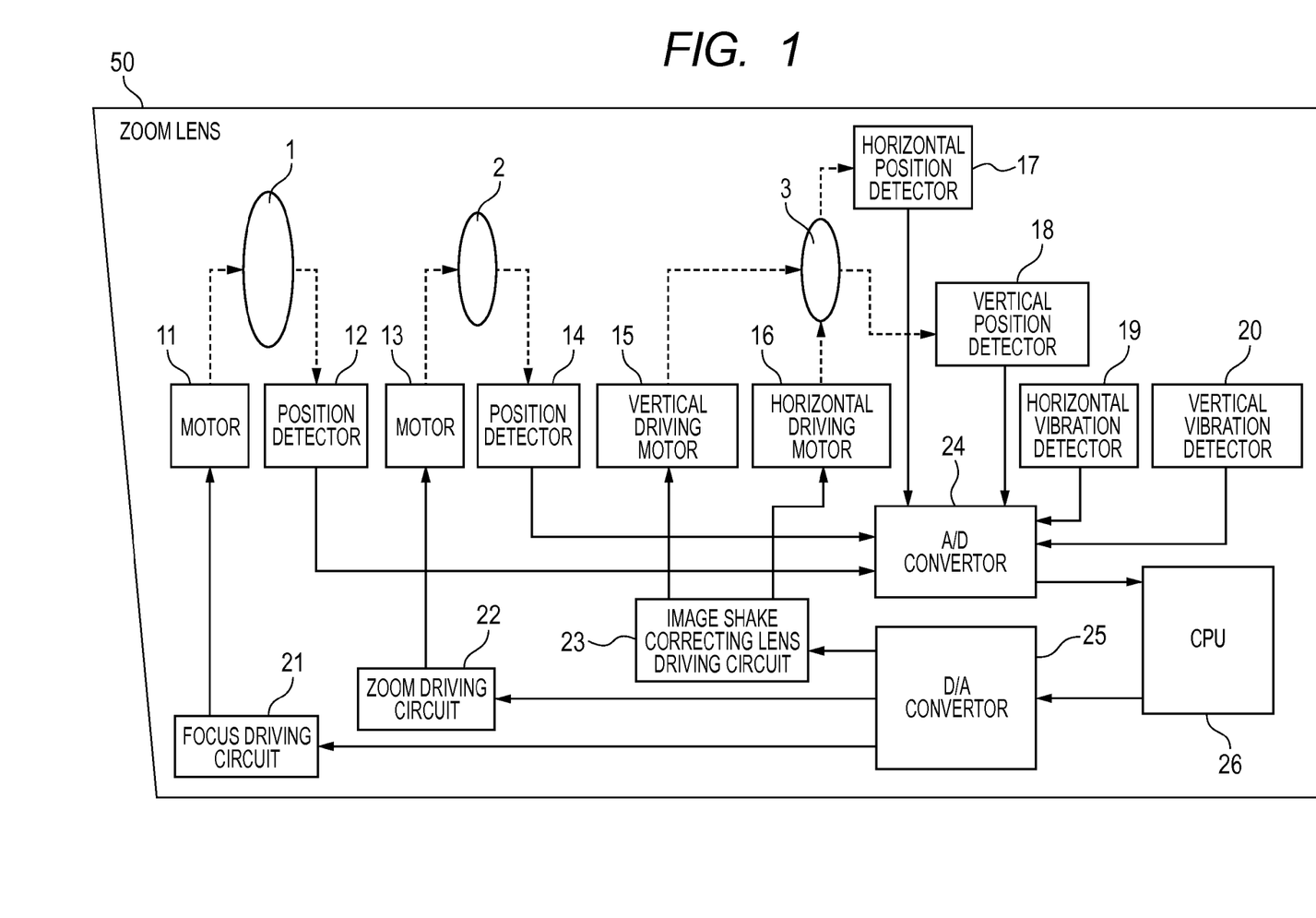
FIG. 1 is a configuration diagram illustrating a zoom lens apparatus according to first to third embodiments of the present invention.

FIG. 1 is a diagram illustrating a configuration of a zoom lens apparatus according to a first embodiment, to which an optical apparatus of the present invention can be applied.

A focus lens unit 1 is capable of displacing an imaging position of a zoom lens apparatus 50 and is driven in an optical-axis direction by a motor 11. A position of the focus lens unit 1 is converted into a voltage by a position detector 12.

A zoom lens unit 2 has a variable focal length and is driven in the optical-axis direction by a motor 13. A position of the zoom lens unit 2 is converted into a voltage by a position detector 14.

An image shake correcting lens unit 3 for decentering an optical axis is driven in a horizontal direction in a plane perpendicular to the optical axis by a horizontal driving motor 16. The amount of horizontal movement of the image shake correcting lens unit 3 is converted into a voltage by a horizontal position detector 17. The image shake correcting lens unit 3 is also driven in a vertical direction in a plane perpendicular to the optical axis by a vertically driving motor 15. The amount of vertical movement of the image shake correcting lens unit 3 is converted into a voltage by a vertical position detector 18.

Figure 2:
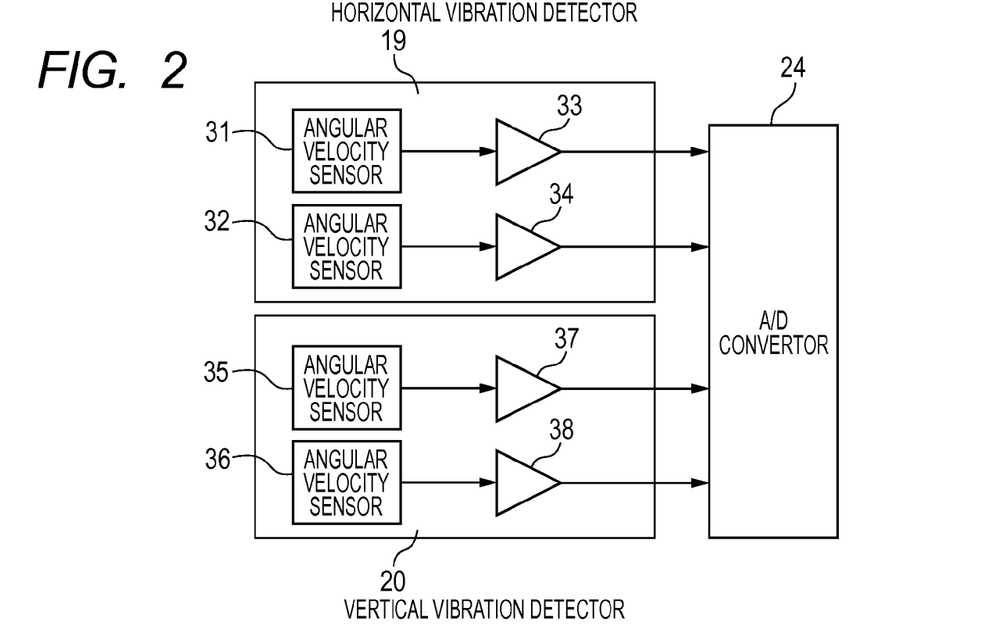
FIG. 2 is a configuration diagram of a horizontal vibration detector and a vertical vibration detector according to the first to third embodiments.
Figure 3:
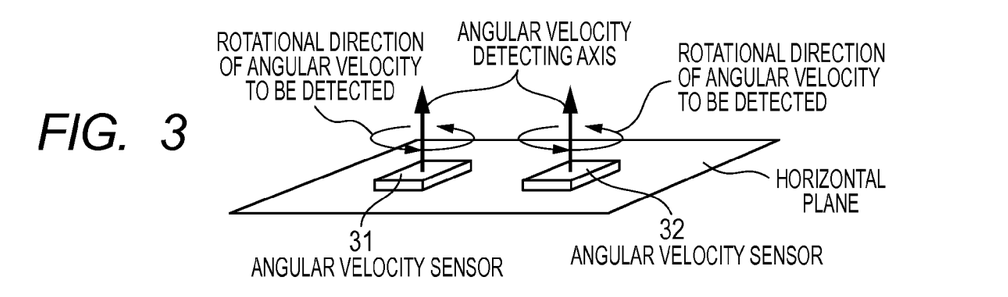
FIG. 3 is a view illustrating the arrangement of angular velocity sensors included in the horizontal vibration detector according to the first and second embodiments.
Figure 4:
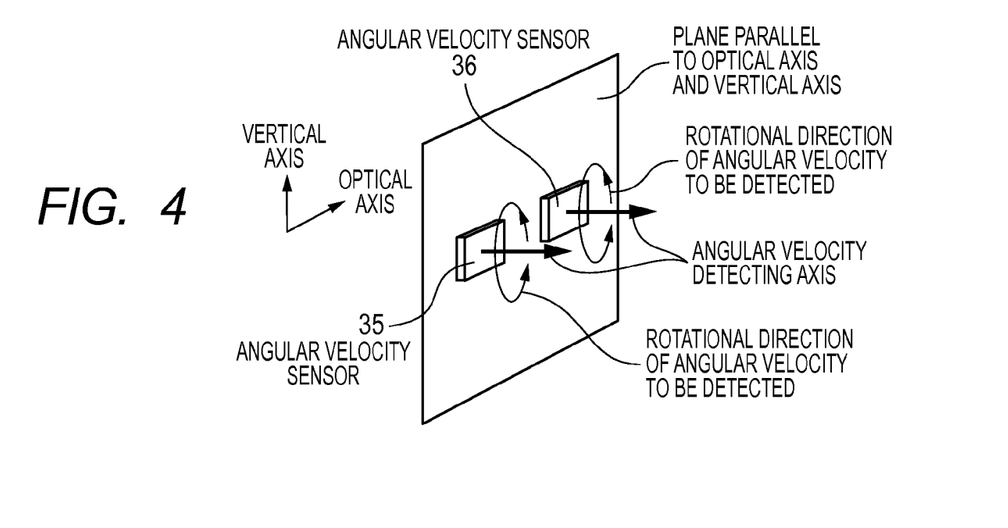
FIG. 4 is a view illustrating the arrangement of angular velocity sensors included in the vertical vibration detector according to the first and second embodiments.

In the following description of the embodiments, it is assumed that a camera is located so that an optical axis thereof extends horizontally. Specifically, the "horizontal direction" means the optical-axis direction when the camera is installed on a level floor or a transverse direction perpendicular to the optical axis, and a "vertical direction" means a longitudinal direction perpendicular to the optical axis for the camera. The horizontal and vertical directions change according to the position and location of the camera when the camera is placed at an angle or upside down. A horizontal vibration applied to the zoom lens apparatus 50 is detected by a horizontal vibration detector 19, whereas a vertical vibration applied to the zoom lens apparatus 50 is detected by a vertical vibration detector 20. As illustrated in FIG. 2, the horizontal vibration detector 19 includes angular velocity sensors 31 and 32 and amplifiers 33 and 34, whereas the vertical vibration detector 20 includes angular velocity sensors 35 and 36 and amplifiers 37 and 38. The angle sensors 31 and 32 included in the horizontal vibration detector 19 are arranged as illustrated in FIG. 3 so as to respectively detect rotational angular velocities on a horizontal plane. The angular velocity sensors 31 and 32 are arranged so that the axial directions of the angular velocities to be detected are the same. The angular velocity sensors 31 and 32 used in this embodiment have the same sensitivity and phase retardation at a vibration frequency (hereinafter, "the same sensitivity and phase retardation" means that a difference in sensitivity is within the range of ±5% and a difference in phase retardation is within the range of ±5% to a vibration at a frequency of 1 to 10 Hz). The angular velocity sensors 35 and 36 included in the vertical vibration detector 20 are arranged as illustrated in FIG. 4 so as to respectively detect rotational angular velocities on a plane parallel to the optical axis and the vertical axis. The angular velocity sensors 35 and 36 are arranged so that the axial directions of the angular velocities to be detected are the same. As in the case of the angular velocity sensors 31 and 32, the angular velocity sensors 35 and 36 used in this embodiment have the same sensitivity and phase retardation at the vibration frequency.

A focus driving circuit 21 generates a signal for driving the motor 11, whereas a zoom driving circuit 22 generates a signal for driving the motor 13. An image shake correcting lens driving circuit 23 generates signals for driving the horizontal driving motor 16 and the vertically driving motor 15.

An A/D converter 24 converts the input voltages into digital data and transmits the thus obtained digital data to a CPU 26. A D/A converter 25 converts the digital data input from the CPU 26 into voltages and outputs the voltages to the focus driving circuit 21, the zoom driving circuit 22 and the image shake correcting lens driving circuit 23.

The CPU 26 generates controlling data for driving the motors 11 and 13, the vertically driving motor 15, and the horizontal driving motor 16 from the pieces of digital data input from the A/D converter 24 and transmits the controlling data to the D/A converter 25.

Figure 5:
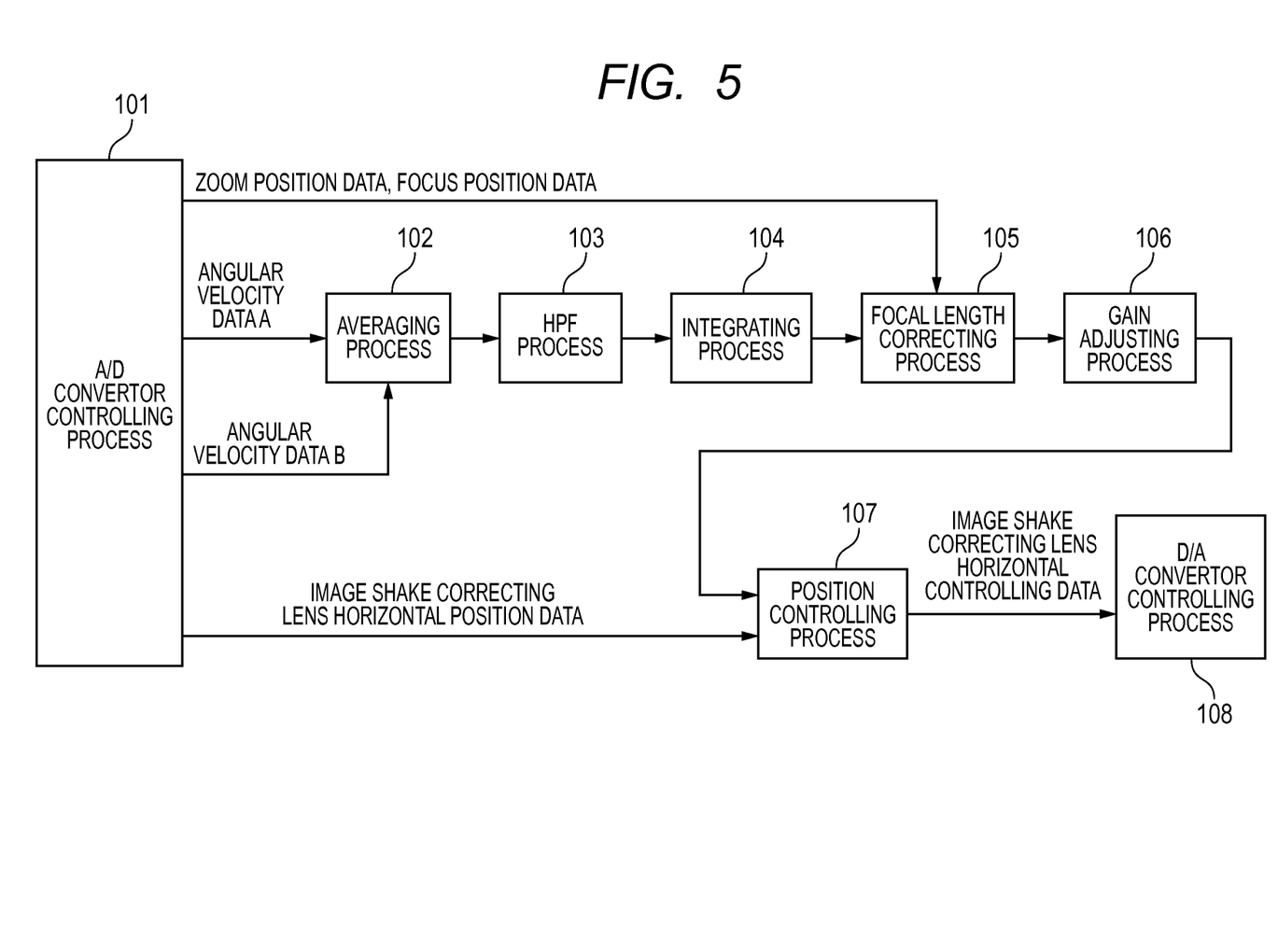
FIG. 5 is a block diagram of an image shake correcting process according to the first embodiment.

Hereinafter, an image shake correcting process performed in the CPU 26 is described. FIG. 5 is a block diagram illustrating the image shake correcting process in the horizontal direction according the first embodiment. In an A/D converter controlling process 101, focus position data, zoom position data, angular velocity data A, angular velocity data B, and image shake correcting lens position data are obtained. The angular velocity data A corresponds to the angular velocity data obtained from the angular velocity sensor 31, whereas the angular velocity data B corresponds to the angular velocity data obtained from the angular velocity sensor 32. In an averaging process 102, the pieces of angular velocity data A and B are subjected to an averaging process. In the averaging process 102, an arithmetic mean as expressed by the following equation (1) is used to calculate an output $\bar{x}$ from inputs $x_1$ and $x_2$.

$$\bar{x} = \frac{x_1 + x_2}{2} \quad (1)$$

However, the averaging process is not limited to that for obtaining the arithmetic mean as expressed by equation (1). Therefore, a geometric mean as expressed by the following equation (2) may also be used (only when the inputs $x_1$ and $x_2$ are positive values). Alternatively, other averaging processes may also be performed.

$$\bar{x} = \sqrt{x_1 x_2} \quad (2)$$

In a highpass filter (HPF) process 103, a DC component of the obtained angular velocity data is removed. In an integrating process 104, the vibration angular velocity data is converted into vibration angle data. The angular velocity data is subjected to the averaging process in this embodiment. Alternatively, however, the two pieces of angular velocity data may be first subjected to the integrating process individually and then subjected to the averaging process as the angle data.

In a focal length correcting process 105, an appropriate amount of movement of the image shake correcting lens for a vibration angle differs depending on the focal length of the zoom lens apparatus 50. Therefore, the vibration angle data is multiplied by a focal length correcting gain value to correct the amount of movement. The focal length correcting gain value is obtained from the zoom position data and the focus position data by using a lookup table which is prestored in the CPU 26. In a gain adjusting process 106, the results of the focal length correcting process 105 are multiplied by an adjustment gain value set at the time of initial adjustment to calculate image shake correcting lens position command data so that an image shake amount due to vibrations applied to the zoom lens apparatus 50 and a shake correcting amount obtained by the image shake correcting lens become equal to each other. In a position controlling process 107, image shake correcting lens horizontal controlling data for controlling the horizontal driving motor 16 is generated from the image shake correcting lens position command data calculated in the gain adjusting process 106 and image shake correcting lens horizontal position data obtained in the A/D converter controlling process 101. Then, in a D/A converter controlling process 108, the image shake correcting lens horizontal controlling data is transmitted to the D/A converter 25.

An image shake correcting process in the vertical direction is substantially the same as that in the horizontal direction, and therefore the description thereof is herein omitted.

Figure 6:
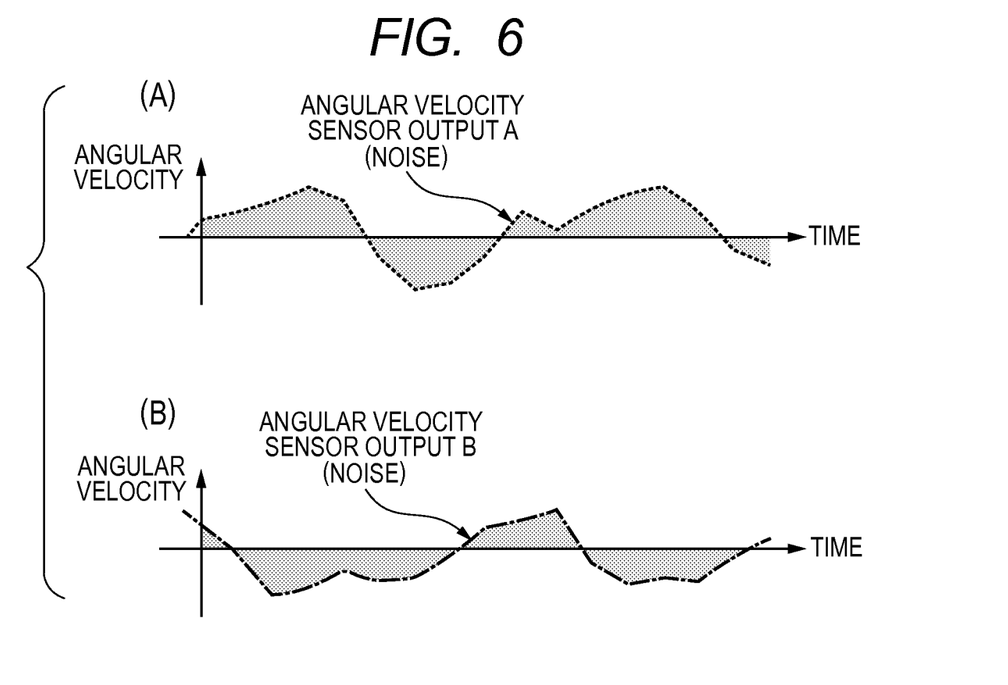
FIG. 6 illustrates an image swinging amount generated when a single angular velocity sensor is used.
Figure 7:
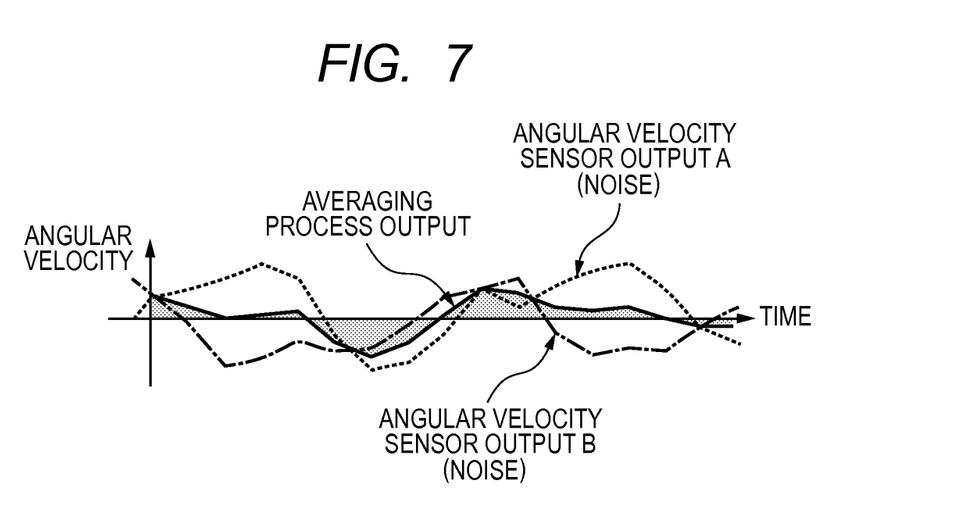
FIG. 7 illustrates the image swinging amount after an averaging process according to the first embodiment is performed.

FIG. 6 illustrates examples of output noises of the angular velocity sensors when no vibration is applied, and FIG. 7 illustrates the results obtained by performing the averaging process on the outputs of the two angular velocity sensors respectively illustrated in (A) and (B) of FIG. 6. As illustrated in FIG. 6, even when no vibration is applied to the angular velocity sensors, each of the angular velocity sensors outputs a minute angular velocity signal. A shaded area illustrated in FIGS. 6, and 7 corresponds to a value obtained by integrating the vibration angular velocity signals, specifically, a value recognized as the vibration angle, and also corresponds to a value indicating an image swinging amount when the image shake correcting process is performed. As is understood from the comparison between FIGS. 6, and 7, the image swinging amount is reduced by averaging the outputs of the two angular velocity sensors as performed in this embodiment in comparison with that in the case where only one angular velocity sensor is used.

Hereinafter, the reduction in image swinging amount by using the two angular velocity sensors is theoretically described. Assuming that noises $x_n$ of the angular velocity sensors are normally distributed around an output generated in a stationary state as a center and the noises $x_n$ of the angular velocity sensors are independent of each other, a standard deviation of the arithmetic mean $\sigma(\bar{x})$ of the noises $x_n$ of N angular velocity sensors can be expressed by the following formula based on the general idea of the standard deviation of the mean.

$$\sigma(\bar{x}) = \frac{1}{N}\sqrt{\sigma(x_1)^2 + \sigma(x_2)^2 + \ldots + \sigma(x_N)^2} \quad (3)$$

where N is the number of angular velocity sensors, and $\sigma(x_n)$ is the standard deviation (value indicating a variation degree). Further, supposing that the standard deviations of the noises $x_n$ of the angular velocity sensors are equal to each other, the following is obtained.

$$\sigma(\bar{x}) = \frac{1}{N}\sqrt{N \cdot \sigma(x)^2} \quad (4)$$
$$= \frac{\sigma(x)}{\sqrt{N}}$$

Therefore, when the outputs of the N angular velocity sensors are subjected to the averaging process, the variation in output in the stationary state is reduced by $N^{-1/2}$. Specifically, by performing the averaging process on the outputs of the two angular velocity sensors as in this embodiment, the image swinging amount can be reduced by $2^{-1/2}$.

On the other hand, when vibrations are applied, only the sensitivities are averaged even if the outputs of the two angular velocity sensors are subjected to the averaging process because the two angular velocity sensors have the same frequency characteristics. Specifically, when the vibration is applied, the characteristics which are substantially the same as those obtained in the case where a single angular velocity sensor is used can be obtained. Accordingly, the degradation of image shake correcting performance according to the frequency does not occur.

As described above, the outputs of the two angular velocity sensors are subjected to the averaging process as in this embodiment. As a result, the image swinging amount generated when no vibration is applied can be reduced without degrading the image shake correcting performance.

Although the number of the used angular velocity sensors is two in this embodiment, the number of angular velocity sensors is not limited to two. Three or more angular velocity sensors may be used. In this case, as the number of angular velocity sensors becomes larger, the image swinging amount is reduced more according to Formula (4).

Figure 8:
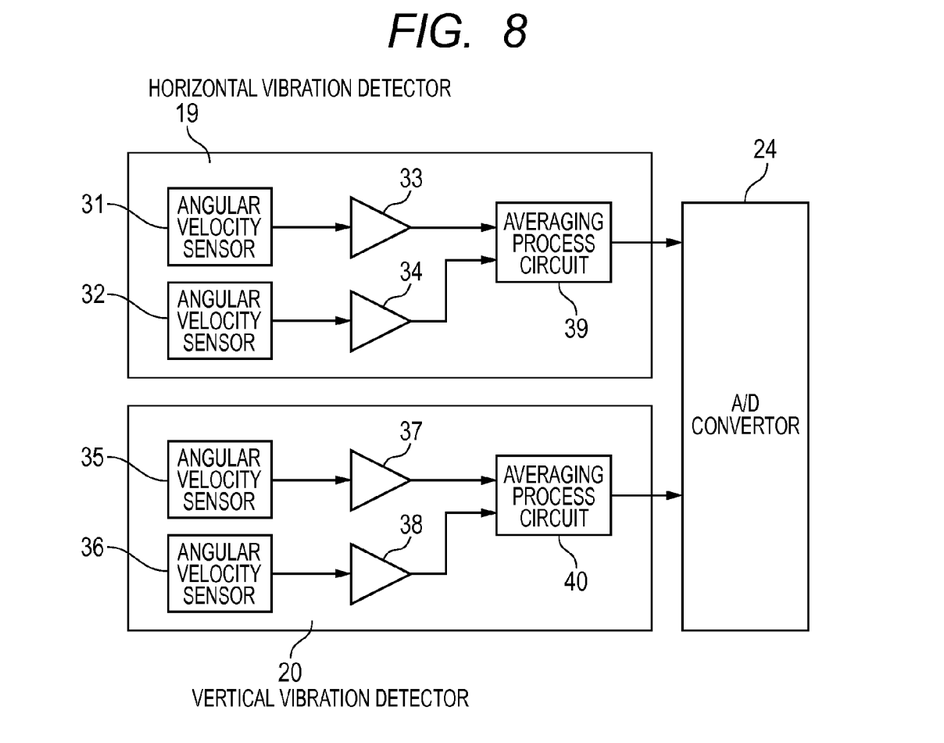
FIG. 8 is a configuration diagram of the horizontal vibration detector and the vertical vibration detector when the averaging process is performed in an analog circuit.
Figure 9:
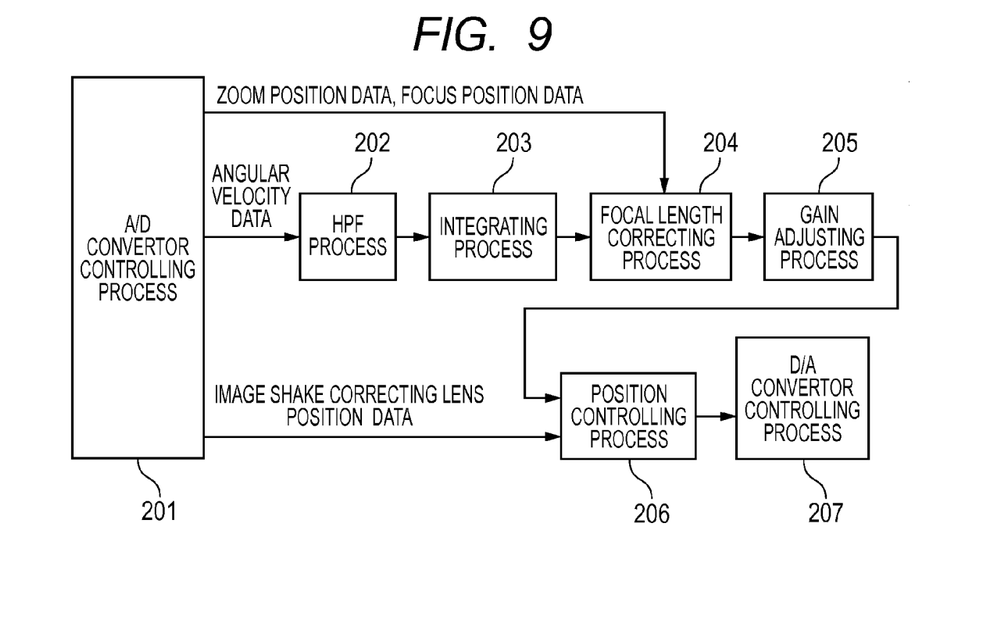
FIG. 9 is a block diagram of the image shake correcting process according to the first embodiment when the averaging process is performed in the analog circuit.

In this embodiment, the signals of the two angular velocity sensors are subjected to the averaging process under digital signals in the CPU 26. However, the signals may be subjected to the averaging process under analog signals. In this case, the horizontal vibration detector 19 and the vertical vibration detector 20 are configured as illustrated in FIG. 8. In addition, the image shake correcting process executed in the CPU 26 is performed as illustrated in FIG. 9. In this manner, the averaging process of the analog signals can be realized. When the averaging process is performed so as to obtain the arithmetic mean, simple adding circuits are used as averaging process circuits 39 and 40 of FIG. 8. A halving operation is performed in the amplifiers 33, 34, 37, and 38 corresponding to the previous stage or in a gain adjusting process 205 illustrated in FIG. 9.

Second Embodiment

In a second embodiment of the present invention, the configurations of the zoom lens apparatus 50 and the vibration detectors 19 and 20, and the arrangement of the angular velocity sensors 31, 32, 35, and 36 are the same as those illustrated in FIGS. 1 to 4, which are described in the first embodiment. Therefore, the description thereof is herein omitted.

Figure 10:
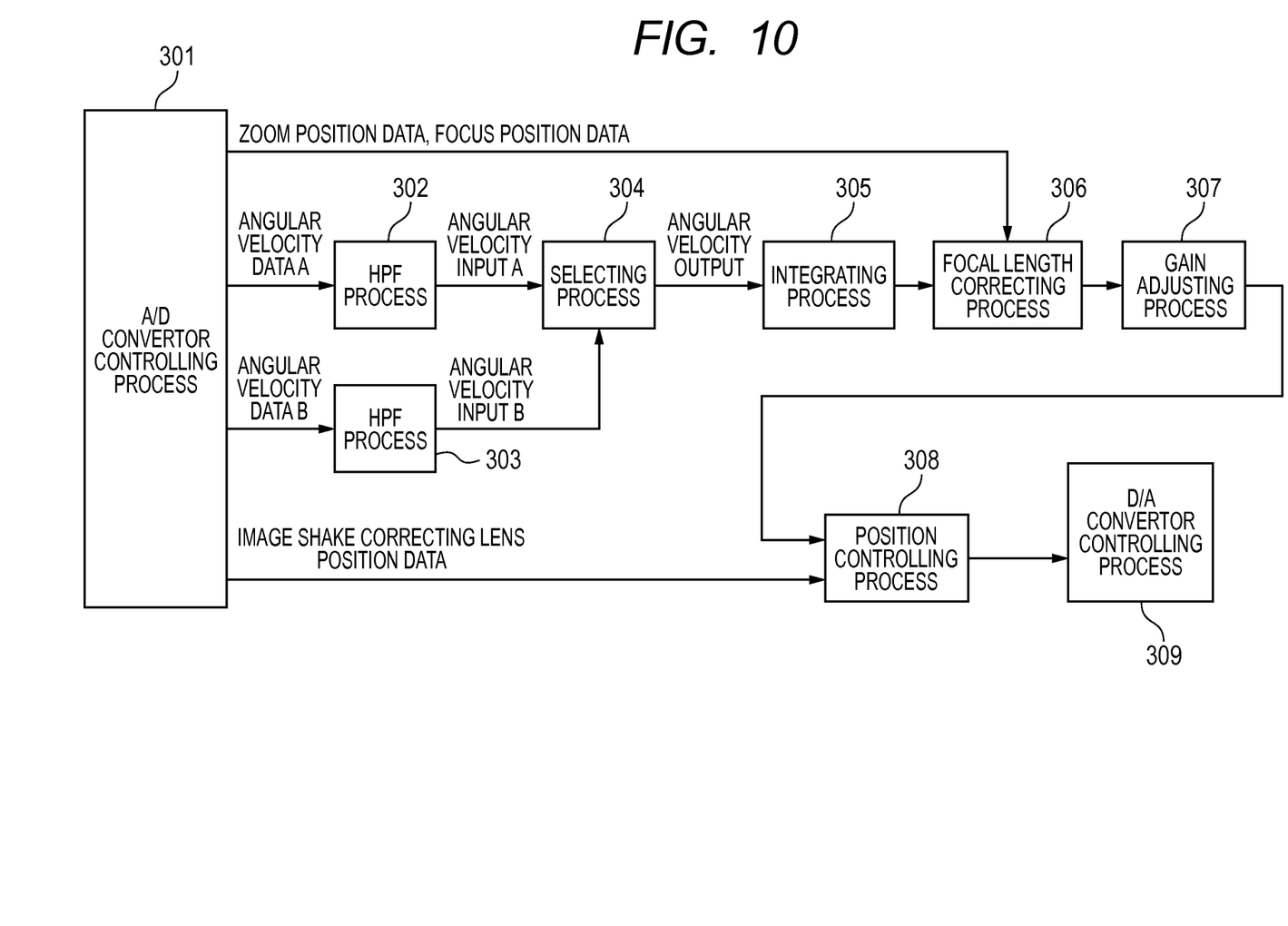
FIG. 10 is a block diagram of an image shake correcting process according to the second embodiment.

An image shake correcting process performed in the CPU 26 in the second embodiment is described. FIG. 10 is a block diagram illustrating the image shake correcting process in the horizontal direction according to the second embodiment. In an A/D converter controlling process 301, the focus position data, the zoom position data, the angular velocity data A, the angular velocity data B, and the image shake correcting lens position data are obtained. A DC component of the angular velocity data A is removed in a highpass filter (HPF) process 302, whereas a DC component of the angular velocity data B is removed in an HPF process 303.

Figure 11:
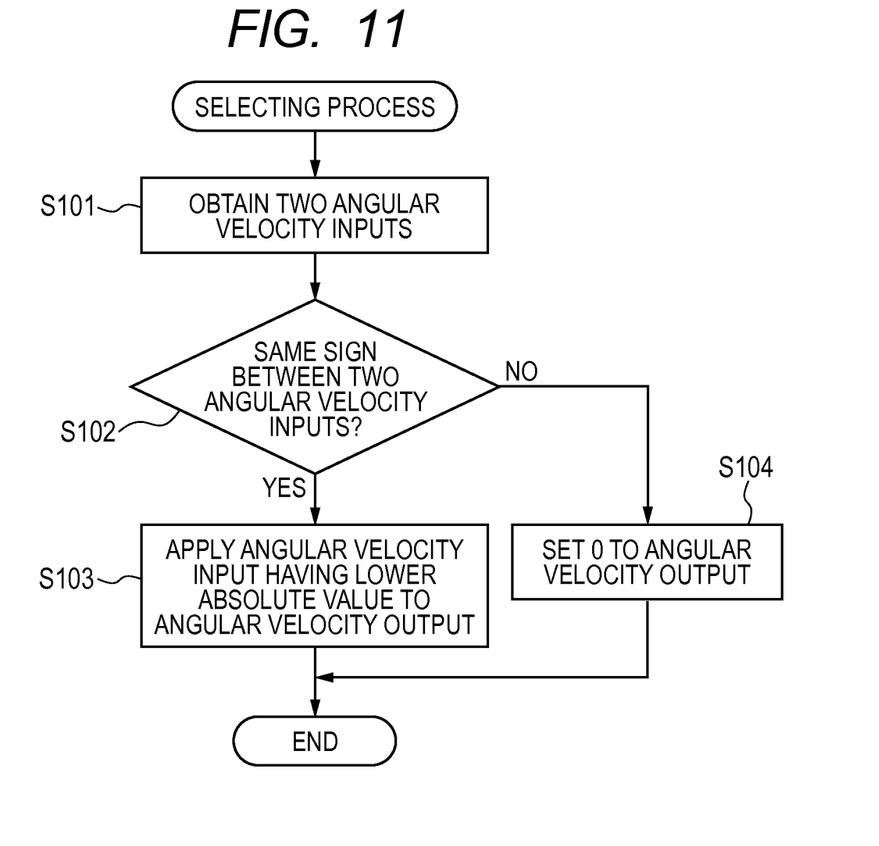
FIG. 11 is a flowchart illustrating a selecting process according to the second embodiment.

Hereinafter, a selecting process 304 is described. FIG. 11 is a flowchart illustrating the selecting process 304. In Step S101, an angular velocity input A output from the HPF process 302 and an angular velocity input B output from the HPF process 303 are obtained. In Step S102, whether or not the signs of the obtained two angular velocity inputs are the same, specifically, whether or not the directions of the angular velocities are the same is determined. When the signs are the same, the process proceeds to Step S103 where one of the two angular velocity inputs, whose absolute value is smaller than the other, is set as an angular velocity output. On the other hand, when it is determined in Step S102 that the signs are not the same, the process proceeds to Step S104 where the angular velocity output is set to zero. The angular velocity output selected in the process illustrated in the flowchart of FIG. 11 is input to an integrating process 305 illustrated in FIG. 10.

The integrating process 305, a focal length correcting process 306, a gain adjusting process 307, a position controlling process 308 and a D/A converter controlling process 309 are the same as the integrating process 104, the focal length correcting process 105, the gain adjusting process 106, the position controlling process 107 and the D/A converter controlling process 108 illustrated in FIG. 5. Therefore, the description thereof is herein omitted.

Figure 12:
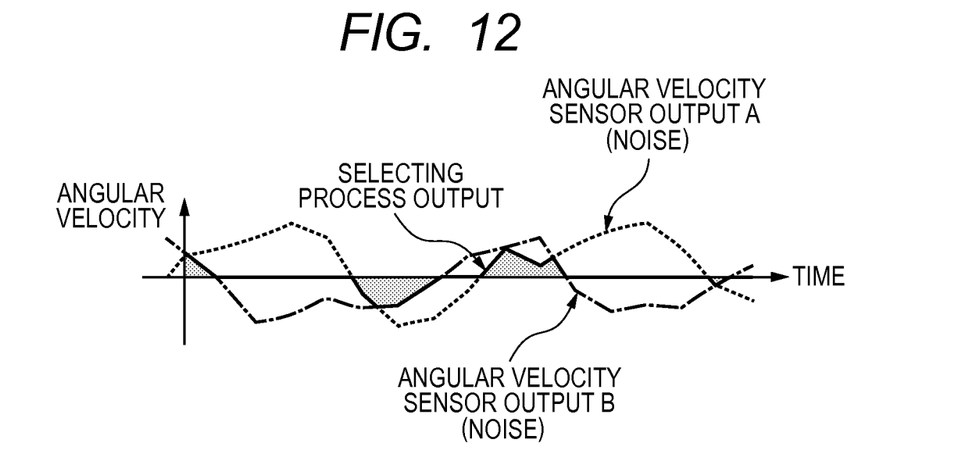
FIG. 12 is a graph illustrating an image swinging amount after the selecting process according to the second embodiment is performed.

FIG. 12 illustrates the results obtained after the outputs of the two angular velocity sensors illustrated in FIG. 6 are subjected to the selecting process 304 when no vibration is applied. Specifically, as is understood from the comparison between FIGS. 6 and 12, the image swinging amount is reduced by performing the selecting process on the outputs of the two angular velocity sensors as in this embodiment in comparison with that in the case where only one angular velocity sensor is used. Moreover, as is understood from the comparison between FIGS. 7 and 12, a shaded area in FIG. 12 is further reduced as compared with that of the output of the averaging process in FIG. 7. Therefore, it is understood that the amount of reduction in image swinging amount is larger than that achieved by the averaging process. This is because the output obtained by performing the process as illustrated in the flowchart of FIG. 11 on the outputs of arbitrary two angular velocity sensors always becomes smaller than the output of the averaging process.

On the other hand, when a vibration is applied, the two angular velocity sensors generate outputs having the same frequency characteristics as is described above in the first embodiment. Therefore, even if the process illustrated in the flowchart of FIG. 11 is performed, an angular velocity sensor output with a lower sensitivity is merely output. Specifically, when the vibration is applied, the characteristics which are the same as those obtained in the case where a single angular velocity sensor is used can be obtained. Accordingly, the degradation of the image shake correcting performance according to the frequency does not occur.

As described above, the outputs of the two angular velocity sensors are subjected to the selecting process as in this embodiment. As a result, the image swinging amount generated when no vibration is applied can be reduced without degrading the image shake correcting performance.

Figure 13:
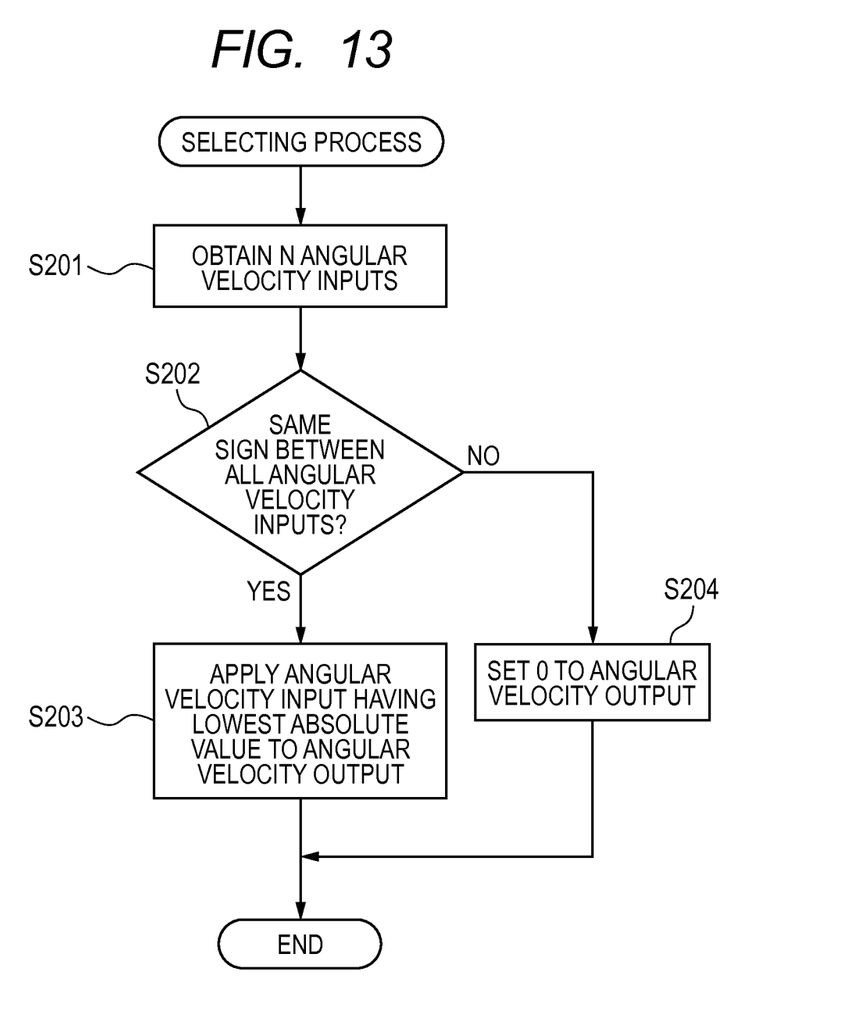
FIG. 13 is a flowchart illustrating the selecting process when three or more angular velocity sensors are used.

In this embodiment, the number of used angular velocity sensors is two. However, the number of angular velocity sensors is not limited to two and may be three or more as in the case of the first embodiment. In this case, the selecting process 304 can be realized as illustrated in FIG. 13.

Figure 14:
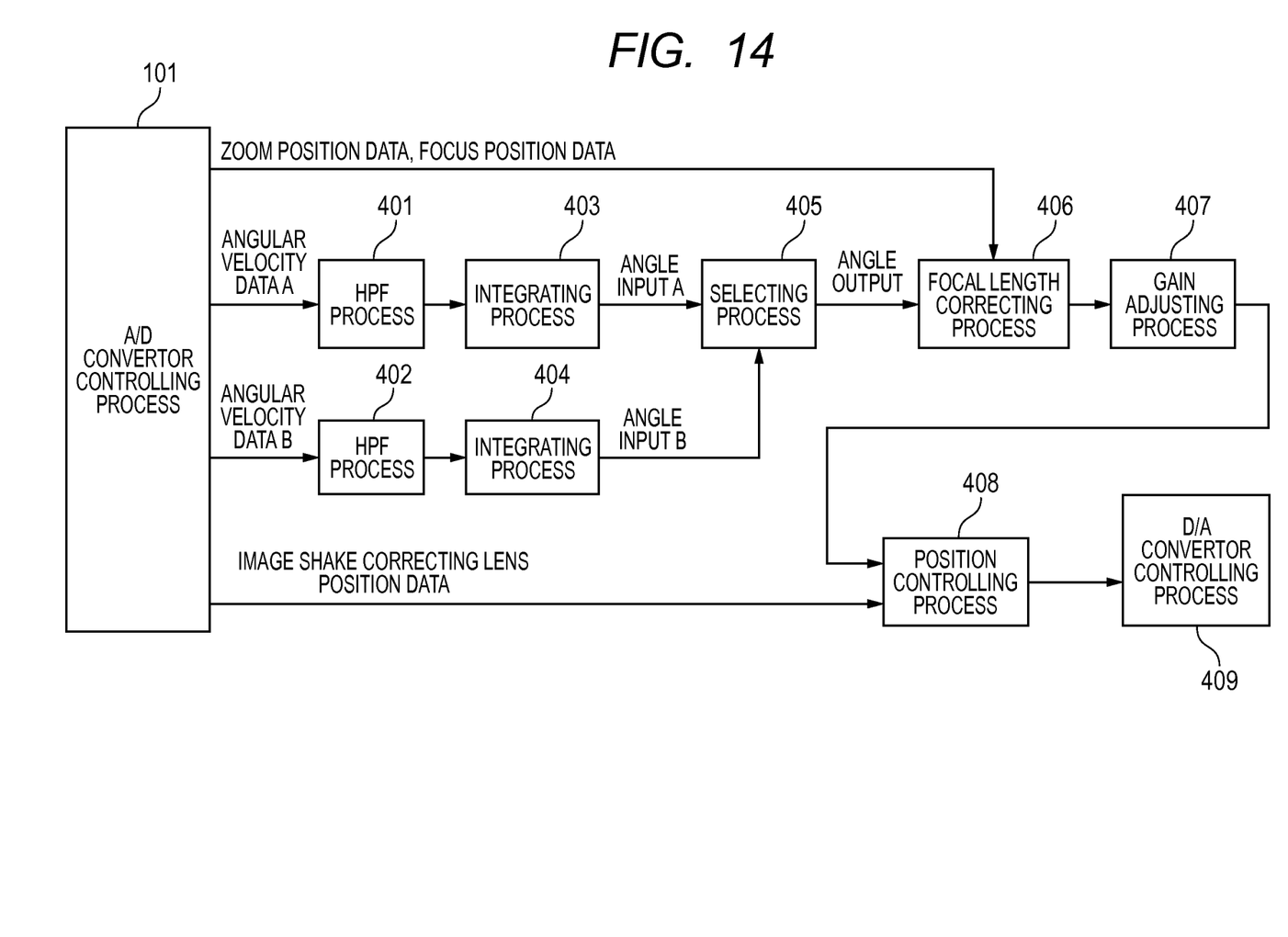
FIG. 14 is a block diagram illustrating the image shake correcting process when outputs of integrating processes are subjected to the selecting process.
Figure 15:
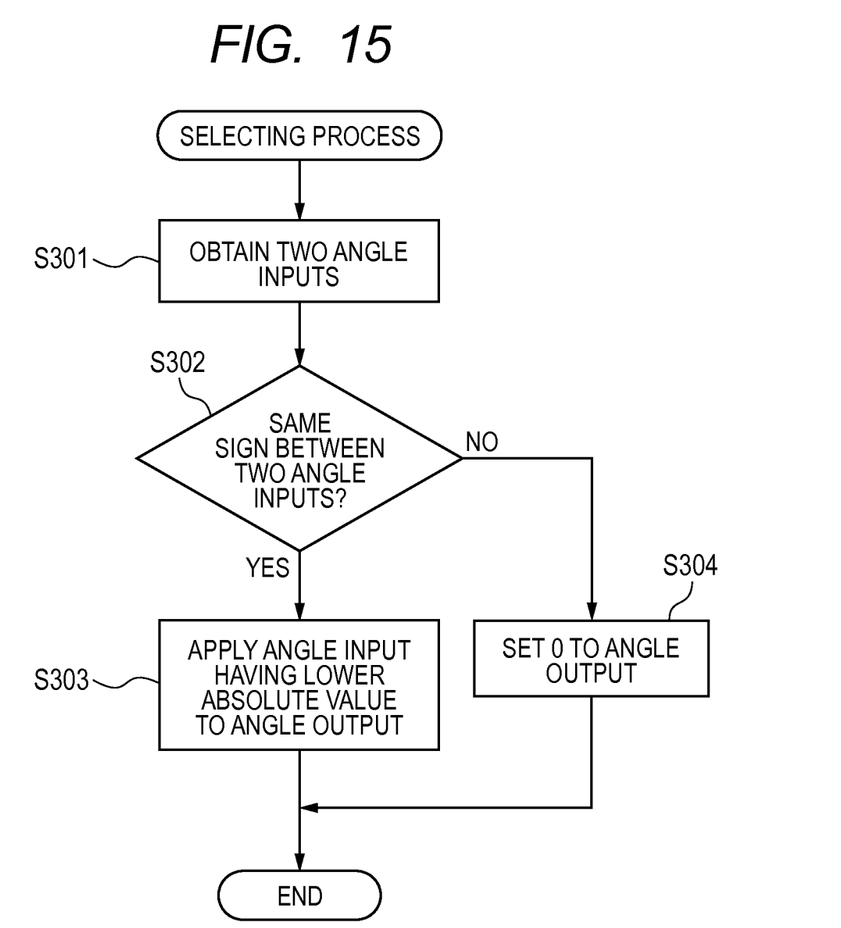
FIG. 15 is a flowchart of the selecting process to be performed on the outputs of the integrating processes.

Further, the selecting process is performed on the angular velocity signals in this embodiment. However, the selecting process may also be performed on the angle signals obtained after integrating processes. In this case, the image shake correcting process performed in the CPU 26 is performed as illustrated in FIG. 14. Then, a selecting process 406 is performed as illustrated in the flowchart of FIG. 15. In this manner, the selecting process performed on the angle signals can be realized.

Third Embodiment

In a third embodiment of the present invention, the configurations of the zoom lens apparatus 50 and the vibration detectors 19 and 20 are the same as those illustrated in FIGS. 1 and 2, which are described in the first embodiment. Therefore, the description thereof is herein omitted.

Figure 16:
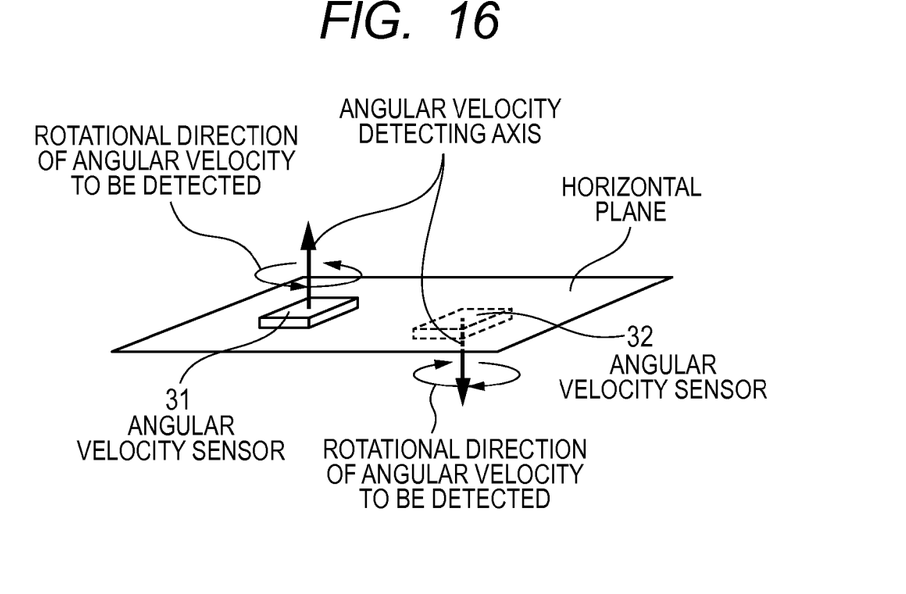
FIG. 16 is a view illustrating the arrangement of angular velocity sensors included in the horizontal vibration detector according to the third embodiment.
Figure 17:
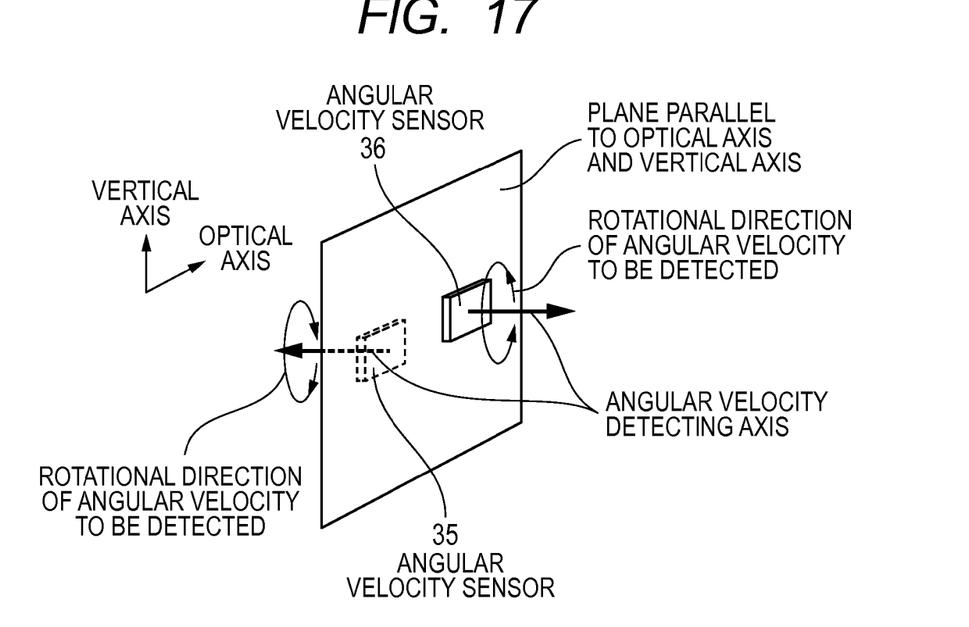
FIG. 17 is a view illustrating the arrangement of angular velocity sensors included in the vertical vibration detector according to the third embodiment.

In this embodiment, the angular velocity sensors 31 and 32 are arranged as illustrated in FIG. 16 so as to respectively detect rotational angular velocities on the horizontal plane. However, the axial directions of the angular velocities to be detected are set at 180 degrees, that is, opposite to each other. The angular velocity sensors 35 and 36 are arranged as illustrated in FIG. 17 so as to respectively detect the rotational angular velocities on the plane parallel to the optical axis and the vertical axis. However, the axial directions of the angular velocities to be detected are set at 180 degrees, that is, opposite to each other.

Figure 18:
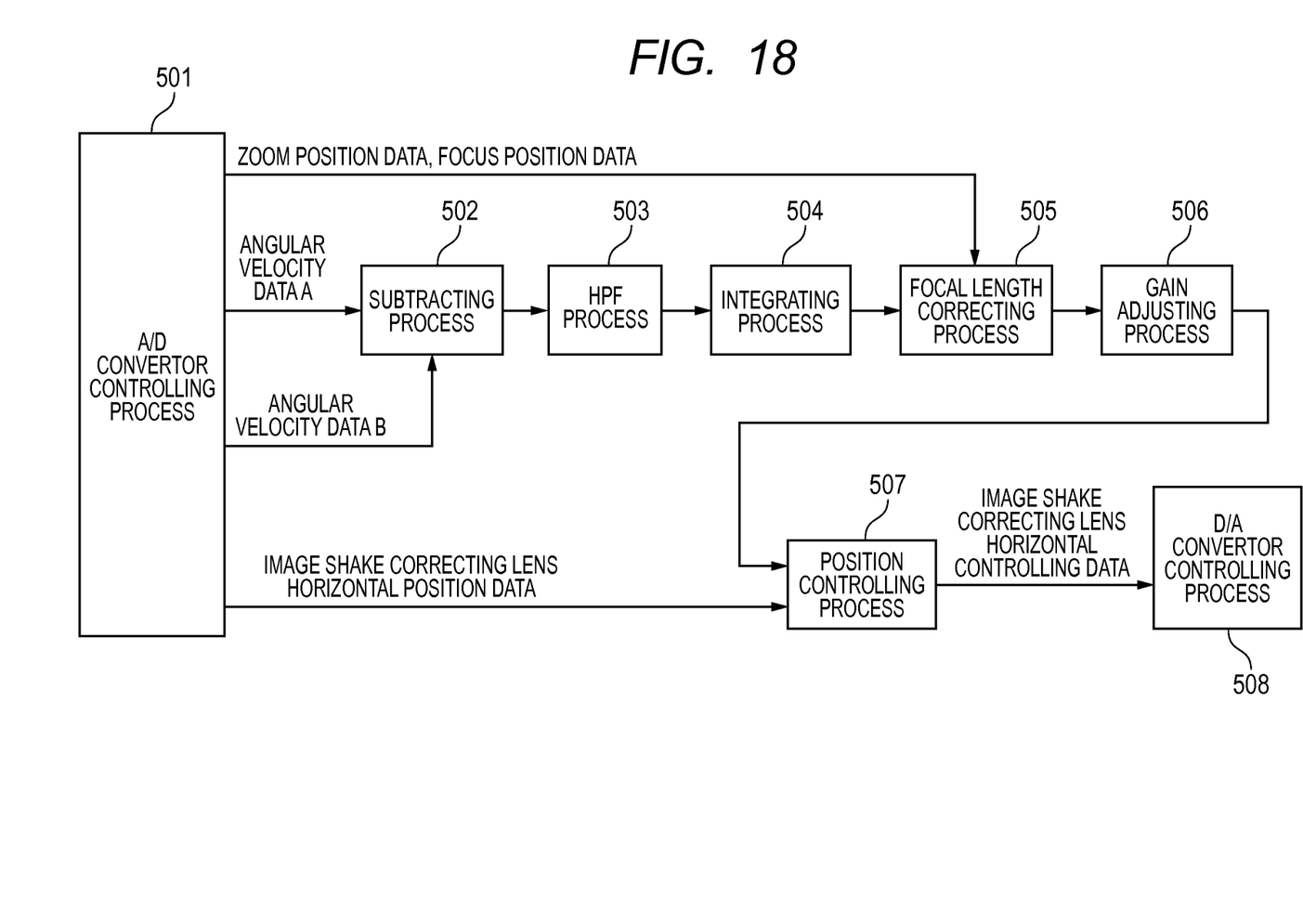
FIG. 18 is a block diagram of an image shake correcting process according to the third embodiment.

Hereinafter, an image shake correcting process performed in the CPU 26 is described. FIG. 18 is a block diagram illustrating the image shake correcting process in the horizontal direction according to the third embodiment. In an A/D converter controlling process 501, the focus position data, the zoom position data, the angular velocity data A, the angular velocity data B and the image shake correcting lens position data are obtained. In a subtracting process 502, for the pieces of angular velocity data A and B, an output $\bar{x}'$ is calculated from the inputs $x_1$ and $x_2$ based on the following equation.

$$\bar{x}' = \frac{x_1 - x_2}{2} \quad (5)$$

An HPF process 503, an integrating process 504, a focal length correcting process 505, a gain adjusting process 506, a position controlling process 507 and a D/A converter controlling process 508 are the same as the HPF process 103, the integrating process 104, the focal length correcting process 105, the gain adjusting process 106, the position controlling process 107 and the D/A converter controlling process 108 illustrated in FIG. 5. Therefore, the description thereof is herein omitted.

Figure 19:
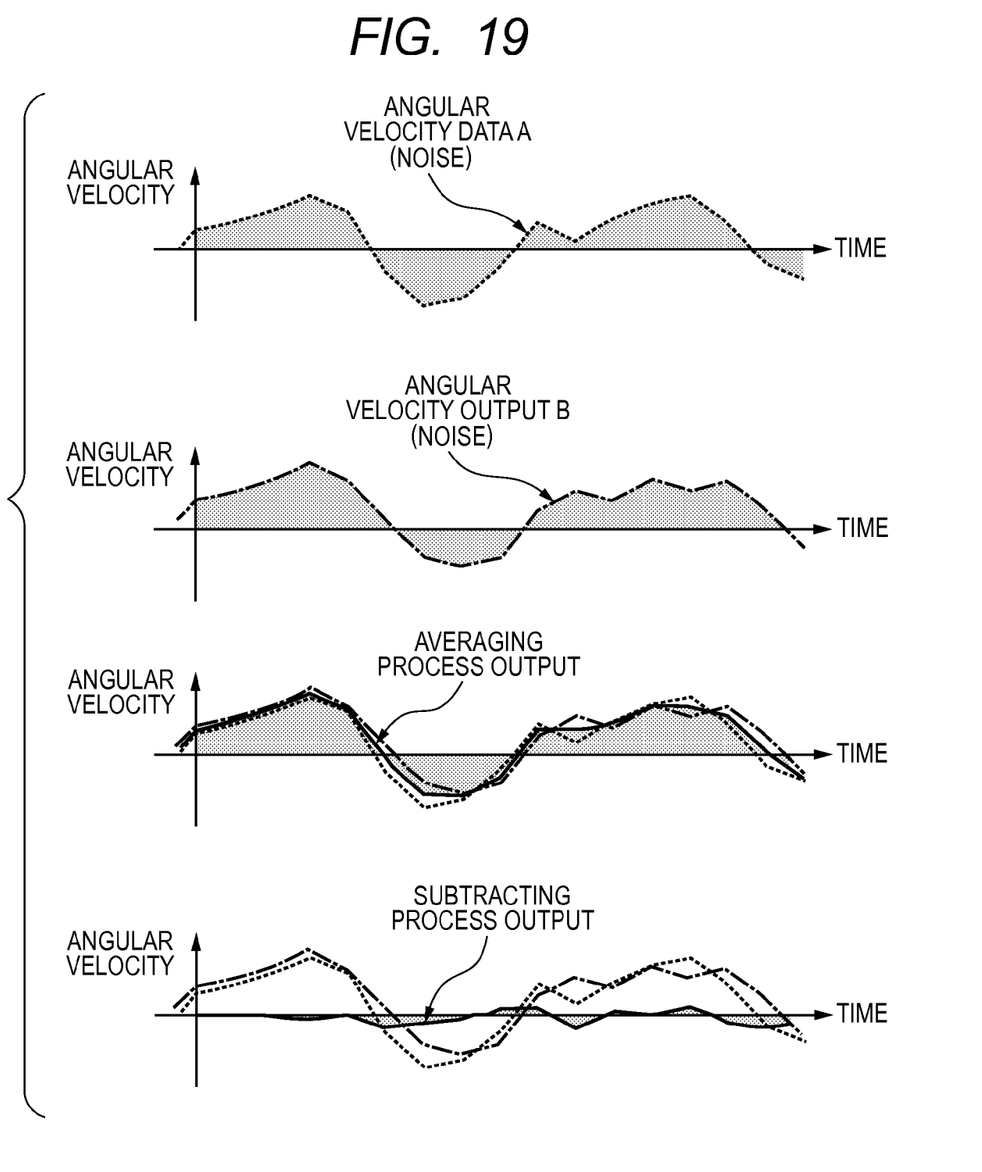
FIG. 19 illustrates an image swinging amount after a subtracting process according to the third embodiment is performed.

The outputs of the two angular velocity sensors are subjected to the subtracting process in this embodiment. As illustrated in FIGS. 16 and 17, however, the angular velocities in the rotational directions opposite to each other are detected. Therefore, the angular velocities are averaged in the process expressed by equation (5). Specifically, the same effects as those of the first embodiment are obtained. Further, noises in the same phase are cancelled by performing the subtracting process as expressed by equation (5). Therefore, when the amount of noises in the same phase is large due to a circuit configuration, the image swinging amount can be greatly reduced. FIG. 19 illustrates the comparison between the image swinging amount after the averaging process as described in the first embodiment is performed and the image swinging amount after the subtracting process described in this embodiment is performed when the amount of noises in the same phase is large. As is understood from FIG. 19, the effects of the subtracting process become greater when the amount of noises in the same phase is large. However, even when the noises generated by the two angular velocity sensors have no relativity, the same effects as those of the first embodiment can be obtained because substantially the same process as that of the first embodiment is performed.

Figure 20:
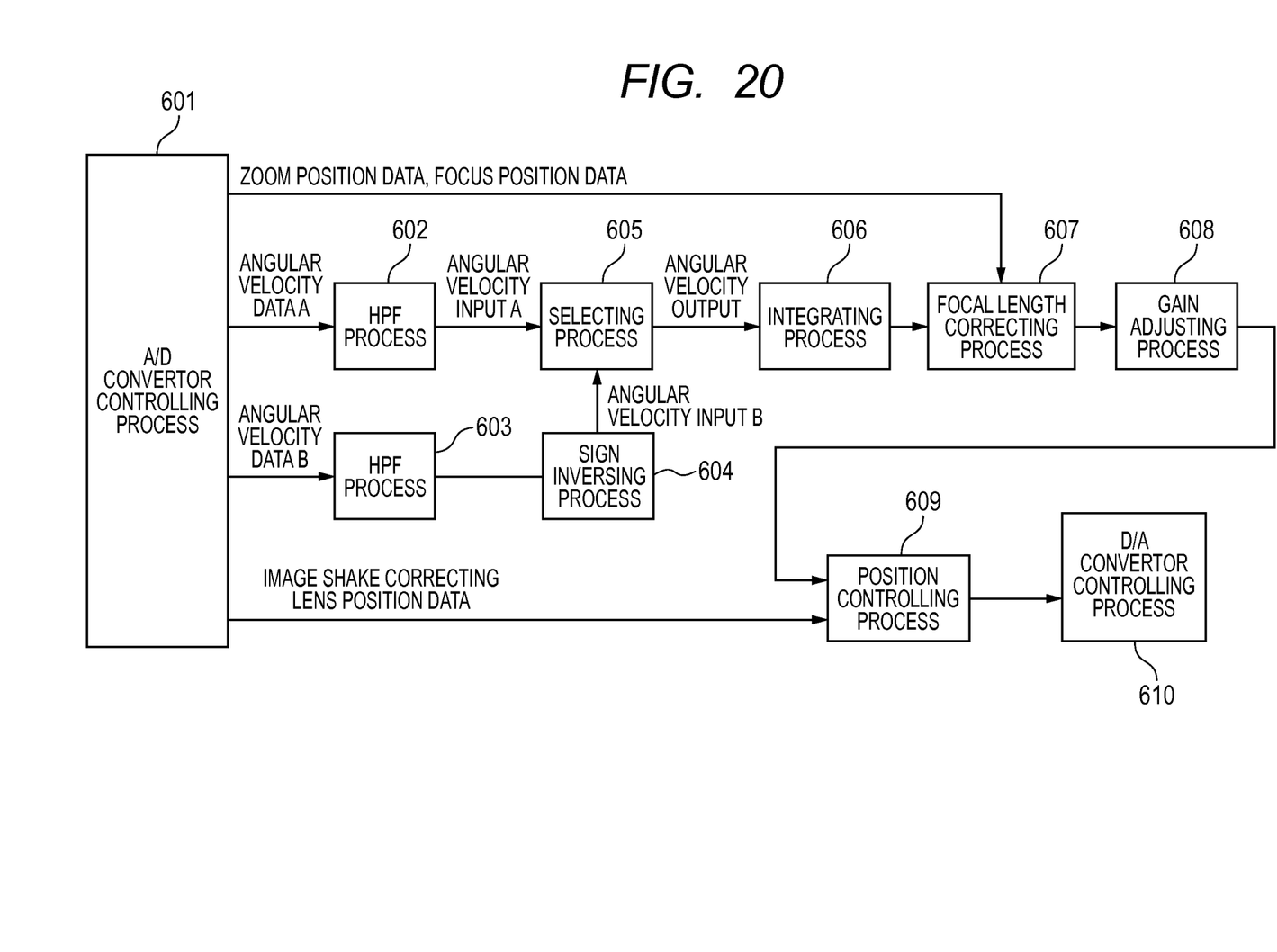
FIG. 20 is a block diagram of the image shake correcting process when a selecting process according to the third embodiment is performed.

Although the subtracting process is performed under the state in which the detecting axial directions of the two angular velocity sensors are set at 180 degrees, that is, opposite to each other in this embodiment, the selecting process as described in the second embodiment may be performed in place of the subtracting process. In this case, the image shake correcting process performed in the CPU 26 is as illustrated in FIG. 20. The image shake correcting process is realized by inversing the sign of one of outputs of HPF processes 602 and 603 (in the case illustrated in FIG. 20, the output of the HPF process 603) in a sign inversing process 604.

In the first to third embodiments, the case where the camera is located so that the optical axis thereof extends in the horizontal direction has been described as an example. Specifically, in the horizontal vibration detector 19, the angular velocity sensors 31 and 32 are provided on the horizontal plane to detect the rotational angular velocities on the horizontal plane. In the vertical vibration detector 20, the angular velocity sensors 35 and 36 are provided on the plane parallel to the optical axis and the vertical axis so as to detect the rotational angular velocities on the plane parallel to the optical axis and the vertical axis. However, it is also noted that, even when the optical axis of the camera does not horizontally extend, the same effects can be obtained by arranging the angular velocity sensors 31 and 32 of the horizontal vibration detector 19 on the plane parallel to the optical axis so that the angular velocities in the axial direction perpendicular to the plane are detected.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-125856, filed Jun. 1, 2010, which is hereby incorporated by reference herein in its entirety.

What is claimed is:

1. An optical apparatus for a zoom lens apparatus, comprising:
   a unit for displacing an imaging position in a direction perpendicular to an optical axis;
   at least two angular velocity sensors configured to detect a vibration of the zoom lens apparatus, the at least two angular velocity sensors having axes for detecting an angular velocity, the axes being parallel to each other;
   an angle computing unit for calculating an angle based on an output of the at least two angular velocity sensors; and
   a driving unit for driving the unit for displacing the imaging position in the direction perpendicular to the optical axis according to the angle calculated by the angle computing unit,
   wherein the angle computing unit comprises a direction determining unit for determining the direction of the outputs of each of the at least two angular velocity sensors,
   wherein when at least two directions obtained by the direction determining unit include a different direction, the angle computing unit sets the angular velocity output to zero and then calculates the angle, and
   wherein when all the at least two determined directions are the same, the angle computing unit uses an output of one of the at least two angular velocity sensors, the output having a smallest absolute value of the angular velocity, to calculate the angle.

2. An optical apparatus according to claim 1, wherein the at least two angular velocity sensors have the same frequency characteristics.

3. An optical apparatus according to 1, wherein:
   the at least two angular velocity sensors comprise two angular velocity sensors having the axes for detecting the angular velocity, the axes being provided opposite to each other; and
   the angle computing unit performs a process after an output of one of the two angular velocity sensors is inversed.

* * * * *